United States Patent
Uphus

(10) Patent No.: US 7,017,732 B2
(45) Date of Patent: Mar. 28, 2006

(54) MULTIPLE EXTRUDER CONFIGURATION

(75) Inventor: Reinhard Uphus, Hannover (DE)

(73) Assignee: Berstorff GmbH, Hannover (DE)

(*) Notice: Subject to any disclaimer, the term of this patent is extended or adjusted under 35 U.S.C. 154(b) by 0 days.

(21) Appl. No.: 10/497,377

(22) PCT Filed: Dec. 5, 2002

(86) PCT No.: PCT/DE02/04503

§ 371 (c)(1),
(2), (4) Date: Jun. 3, 2004

(87) PCT Pub. No.: WO03/053646

PCT Pub. Date: Jul. 3, 2003

(65) Prior Publication Data

US 2005/0069601 A1    Mar. 31, 2005

(30) Foreign Application Priority Data

Dec. 7, 2001 (DE) ................. 101 62 076

(51) Int. Cl.
*B29B 7/74* (2006.01)
(52) U.S. Cl. .................. 198/663; 198/662
(58) Field of Classification Search ......... 198/657–666
See application file for complete search history.

(56) References Cited

U.S. PATENT DOCUMENTS

| | | | | |
|---|---|---|---|---|
| 2,458,068 A | * | 1/1949 | Fuller | 100/104 |
| 3,738,409 A | * | 6/1973 | Skidmore | 159/2.2 |
| 4,089,300 A | * | 5/1978 | Keen et al. | 119/57.4 |
| 4,393,983 A | * | 7/1983 | Eriksson | 222/233 |
| 4,408,888 A | * | 10/1983 | Hanslik | 366/83 |
| 4,617,177 A | * | 10/1986 | Schumacher | 422/273 |
| 4,690,267 A | * | 9/1987 | Gradoboev et al. | 198/396 |
| 4,801,085 A | * | 1/1989 | Fischer | 239/1 |
| 4,953,712 A | * | 9/1990 | Meester | 209/669 |
| 4,970,037 A | * | 11/1990 | Kafka et al. | 264/101 |
| 5,266,256 A | * | 11/1993 | Jerman et al. | 264/211.24 |
| 5,372,418 A | * | 12/1994 | Biesenberger et al. | 366/85 |
| 5,534,212 A | * | 7/1996 | Chokappa et al. | 264/211.11 |
| 5,873,654 A | * | 2/1999 | Lu | 366/84 |
| 6,024,479 A | * | 2/2000 | Haring | 366/75 |
| RE37,008 E | * | 1/2001 | Sanchez et al. | 426/496 |
| 6,298,751 B1 | * | 10/2001 | Ide et al. | 74/665 GA |
| 6,808,354 B1 | * | 10/2004 | Kulbeth | 414/326 |

FOREIGN PATENT DOCUMENTS

| | | | |
|---|---|---|---|
| DE | 29710235 | * | 9/1997 |
| EP | 1110691 | * | 6/2001 |
| GB | 1167850 | * | 10/1969 |

* cited by examiner

Primary Examiner—Douglas Hess
(74) Attorney, Agent, or Firm—Cohen, Pontani, Lieberman & Pavane

(57) ABSTRACT

The invention concerns a multiple-extruder configuration in which two co-rotating twin-screw extruders and a counter-rotating twin screw extruder are connected to each other with respect to the flow of material.

Figure 1:
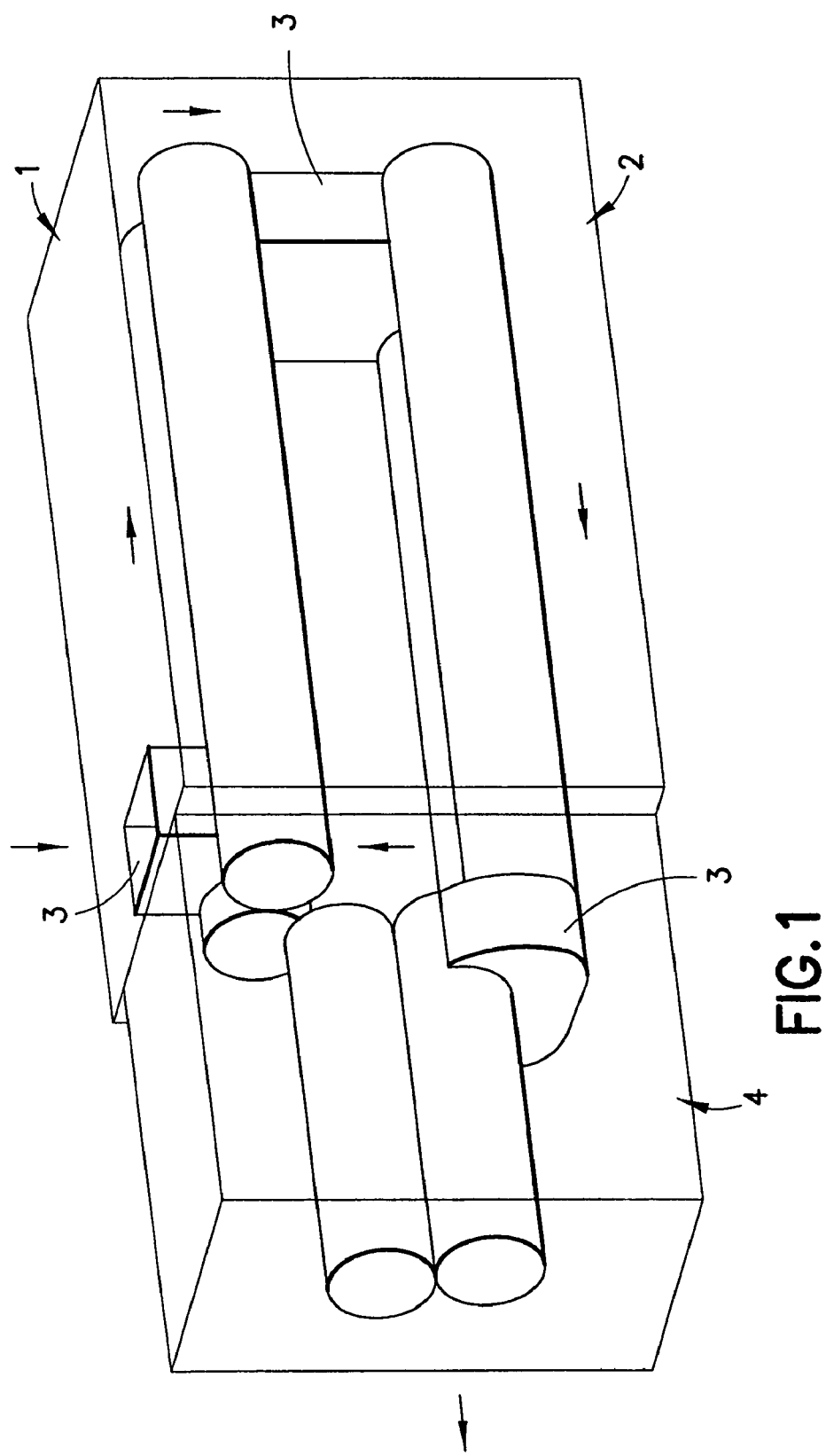

11 Claims, 3 Drawing Sheets

MULTIPLE EXTRUDER CONFIGURATION

CROSS REFERENCE TO RELATED APPLICATIONS

This is a U.S. national stage of application under 35 U.S.C. §371 of international stage application No. PCT/DE02/04503, filed on Dec. 5, 2002. Priority is claimed under 35 U.S.C. §119(a) and under 35 U.S.C. §365(b) from German Patent Application No. 101 62 076.4, which was filed on Dec. 7, 2001, and from which priority was properly claimed in the aforementioned international stage application.

FIELD OF INVENTION

The invention concerns a multiple-extruder configuration with the use of twin-screw extruders.

BACKGROUND OF THE INVENTION

There are many processes used in compounding, which are limited either by torque or residence time.

Example of a Process Limited by Torque: continuous mixing of rubber compounds. In this case, the speeds of the twin-screw extruder must be kept as low as possible, since otherwise the very high viscosity of the mixture leads to temperature problems due to mechanical dissipation in the mixture. Of course, at these low speeds and at an acceptable throughput, the screw shaft torques are very high. The speed is then usually raised at constant throughput until the torque is slightly below the maximum allowable torque. However, this causes the temperature of the compound to rise again.

Example of a Process Limited by Residence Time: continuous silylation of a rubber mixture that contains silicic acid or dynamic vulcanization of fully crosslinked vulcanized thermoplastic elastomers (TPE-V).

In both processes, a chemical reaction occurs during the extrusion with the twin-screw extruder, which requires a certain residence time (depending on the allowable average temperature of the compound). The machine length with twin-screw extruders is limited by the absolute torsion of the shafts, which increases with increasing length and is about 60 D. Greater lengths would mean increasing wear.

Increasingly, the industry is demanding that the finished compounded mixture be formed through a die in the same operation and/or be pressed through a screen pack to screen out larger particles. Both are associated with a relatively large pressure buildup. Although the co-rotating twin-screw extruder is very well suited for mixing tasks, it is very poorly suited for building up high pressures due to its low pumping efficiency. In the case of highly viscous mixtures, very large amounts of heat are then produced by dissipation.

SUMMARY OF THE INVENTION

The invention may create a multiple-extruder configuration which, on the one hand, allows a high mean residence time for processes that are limited by residence time and, on the other hand, allows a high torque relative to the screw length for processes limited by torque. The new configuration should exploit the good mixing characteristics of a co-rotating twin-screw extruder and the excellent pressure buildup capacity of a counter-rotating twin-screw extruder.

In accordance with the invention, this may be achieved by connecting, with respect to the flow of the compound, two co-rotating twin-screw extruders and a counter-rotating twin-screw extruder.

In accordance with a first embodiment of the invention, the two co-rotating twin-screw extruders and the counter-rotating twin-screw extruder are connected in series. In this way, the torque per screw length and the residence time can be doubled. The counter-rotating twin-screw extruder, which follows the two co-rotating twin-screw extruders, then serves to build up the pressure.

In accordance with a second embodiment, the two co-rotating twin-screw extruders are arranged parallel to each other, where the rotational direction of the one pair of screws can be the same as or different from that of the other pair. The two co-rotating twin-screw extruders are followed by a counter-rotating twin-screw extruder that serves to build up the pressure.

If the two pairs of screws have different directions of rotation, one of the screw shafts in each pair can be lengthened and connected to a screw shaft of the twin-screw extruder that follows it, so that its screw shafts then counter-rotate.

This multiple-extruder configuration can have a drive with four output shafts, which are connected to the screw shafts of the co-rotating twin-screw extruders.

However, it is also possible to use a drive with six output shafts, so that each screw shaft is driven separately.

Finally, however, in a multiple-extruder configuration of this type, it is also possible to provide gears at the end of each screw shaft, which intermesh in such a way that the screw shafts of the co-rotating twin-screw extruders drive the screw shafts of the counter-rotating twin-screw extruder.

In this regard, it is advantageous to mount a total of six gears in such a way that the two gears of each twin-screw extruder mesh with the gear on one of the screw shafts of the counter-rotating twin-screw extruder and the gears of the counter-rotating extruder engage with each other.

The invention is explained below with reference to specific embodiments.

DETAILED DESCRIPTION OF THE PRESENTLY PREFERRED EMBODIMENTS

Figure 2:
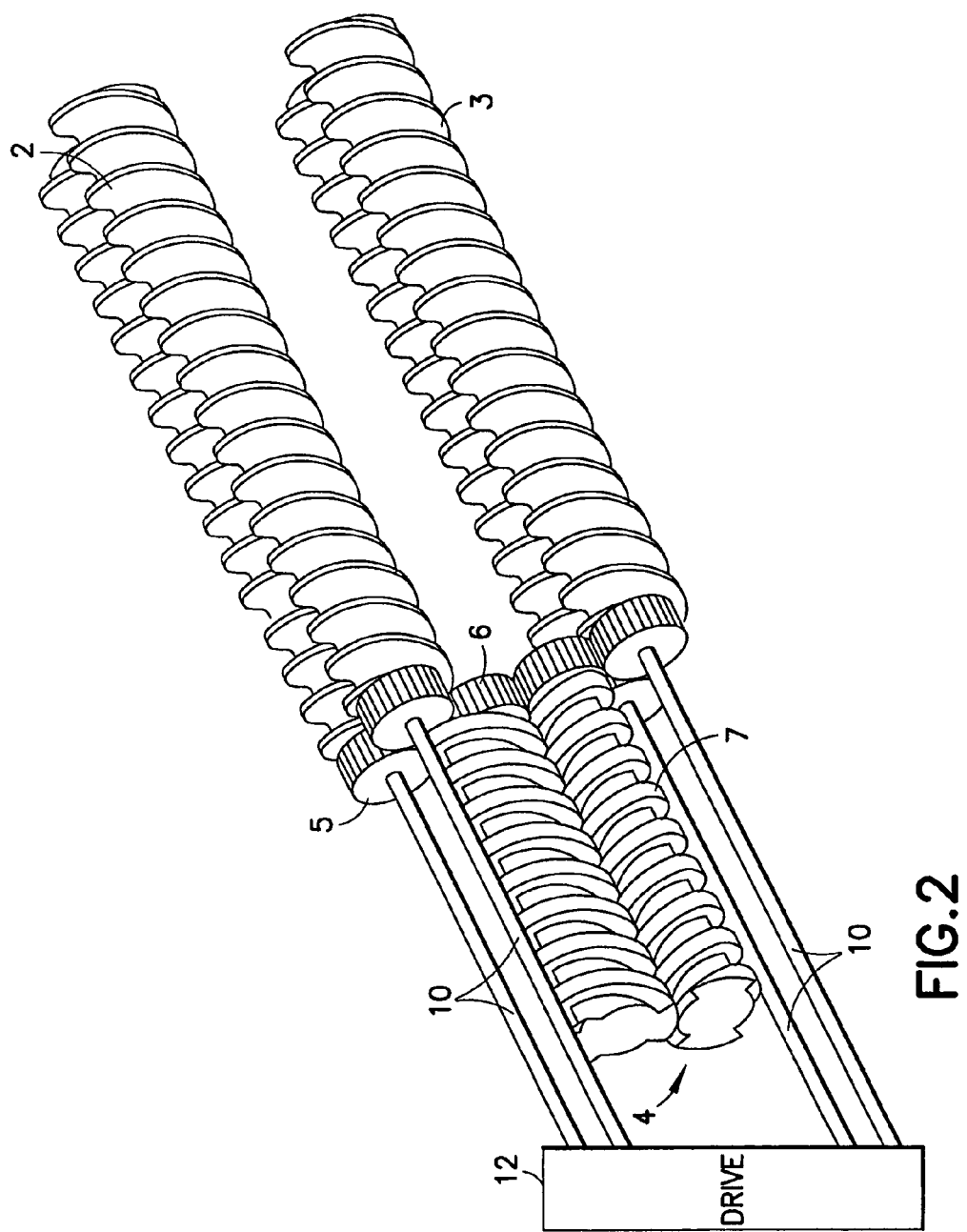
Figure 3:
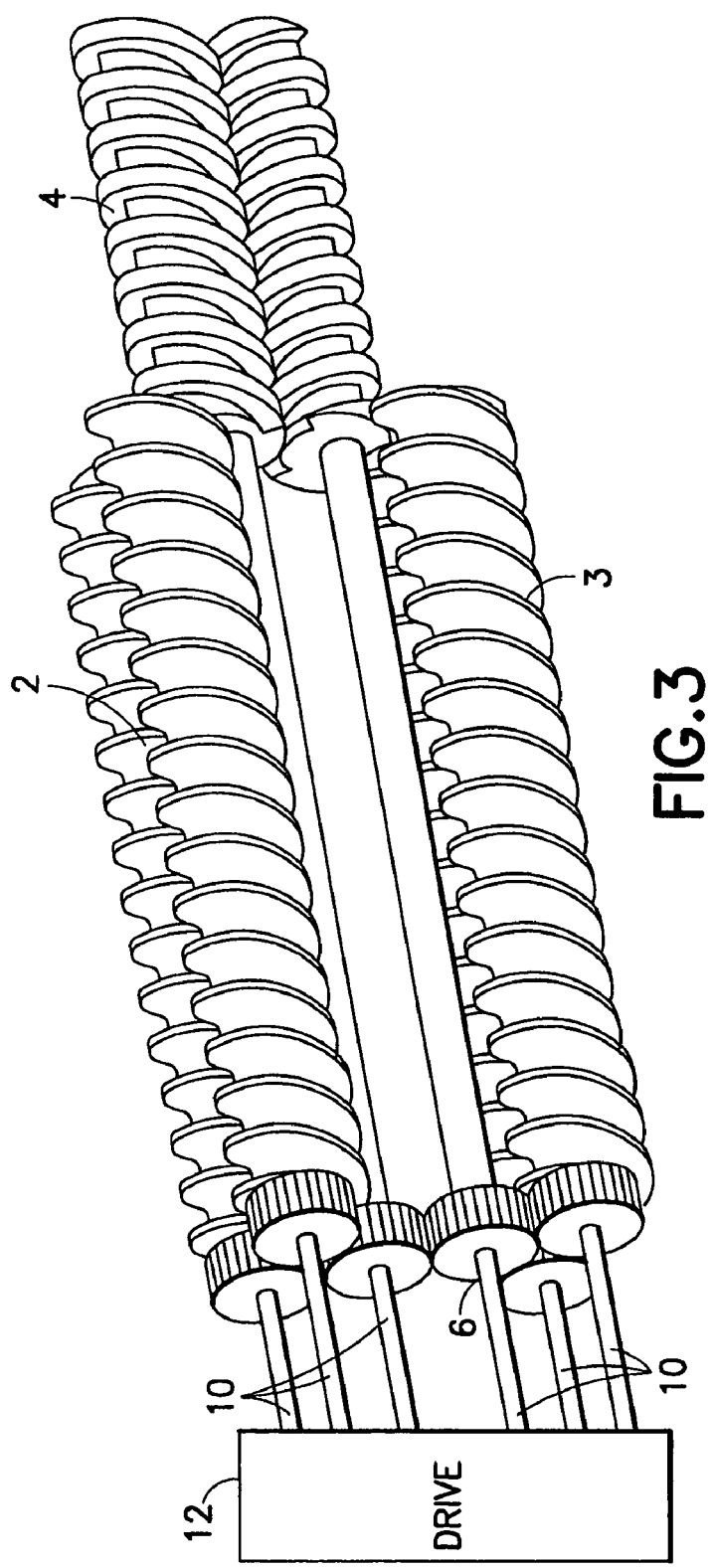

FIG. 1 shows a multiple-extruder configuration, in which the two co-rotating twin-screw extruders 1, 2 are arranged parallel to, and one above, the other. The material to be extruded is fed into the upper extruder 1 at first feeder 3a. After it has been pushed Through the first extruder 1, it is fed into the second extruder 2 via second feeder 3b and finally reaches the counter-rotating twin-screw extruder 4 via a third feeder 3c, which is designed as an expeller. In FIGS. 2 and 3, the material flows in the same direction as in the design shown in FIG. 1. They merely show different types of drives. In FIG. 2, the screw shafts of the co-rotating extruders 2 and 3 are driven by four drive shafts 10 of a drive 12. Gears 5, which are mounted at the end of each of the screw shafts, drive two additional gears 6, which are mounted on screw shafts 7 of the following counter-rotating twin-screw extruder 4.

In the design shown in FIG. 3, the drive 12 includes six drive shafts 10 such that each of the gears 5, 6 is driven with a separate drive shaft 10. Alternatively, the drive 12 may include only four drive shafts 10 which act on the gears 5. In this alternative embodiment, the gears 5 then drive the screw shafts of the following twin-screw extruder 4 via the gears 6. Unlike the design in FIG. 2, the drive shafts of the counter-rotating twin-screw extruder are parallel to the pairs of screws of the co-rotating twin-screw extruders. The gears 6 may or may not mesh with each other in this case.

As a further alternative, the drive 12 in the embodiment shown in FIG. 3 may act only on the gears 6, which in this case drive the screw shafts of the twin-screw extruders 2, 3 via the gears 5. In this case, the drive power is transmitted via two drive shafts 10.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A multiple-extruder configuration, comprising:
   two co-rotating twin-screw extruders for mixing a material to be extruded, each of the co-rotating twin-screw extruders having separate screws such that the two co-rotating twin-screw extruders together comprise four separate screws; and
   a counter-rotating twin-screw extruder for building up pressure connected to the co-rotating twin-screw extruders by a connection arranged and dimensioned for conducting a flow of the mixed material from the two co-rotating twin-screw extruders.

2. A multiple-extruder configuration in accordance with claim 1, wherein each of the two co-rotating twin-screw extruders and the counter-rotating twin-screw extruder are connected in series.

3. A multiple-extruder configuration in accordance with claim 1, wherein the two co-rotating twin-screw extruders are orientated parallel to each other, and wherein the rotational direction of one of the two co-rotating twins-screw extruders may be the same as or different from the other co-rotating twin-screw extruder, and wherein the two co-rotating twin-screw extruders are followed by a counter-rotating twin-screw extruder that serves to build up pressure.

4. A multiple-extruder configuration in accordance with claim 3, wherein the co-rotating twin-screw extruders have different directions of rotation, and a screw shaft in each of the two co-rotating twin-screw extruders is lengthened and connected to a screw shaft of the counter-rotation twin-screw extruder, so that screw shafts of the co-rotating twin screw extruder counter-rotate.

5. A multiple-extruder configuration in accordance with claim 4, wherein a drive is provided having four output shafts, which are connected to the screw shafts of the co-rotating twin-screw extruders.

6. An extruder apparatus for mixing compounds with residence time requirements and which also must be extruded at a desired pressure comprising:
   a first feeder for loading the compounds;
   a first co-rotating twin screw extruder for mixing the compounds;
   a second co-rotating twin screw extruder for mixing the compounds;
   a second feeder through which the compounds travel from the first co-rotating twin screw extruder to the second co-rotating twin screw extruder;
   a counter-rotating twin screw extruder;
   a third feeder located so that the compounds flow to the counter-rotating twin screw extruder after mixing by the co-rotating twin screw extruders; and wherein the counter-rotating twin screw extruder builds up pressure in the compounds and causes the compounds to exit the apparatus at a desired pressure.

7. An extruder apparatus for mixing compounds with residence time requirements and which also must be extruded at a desired pressure as in claim 6: wherein the two co-rotating twin-screw extruders and the counter-rotating twin-screw extruder are connected in series.

8. An extruder apparatus for mixing compounds with residence time requirements and which also must be extruded at a desired pressure as in claim 6: wherein the two co-rotating twin-screw extruders are orientated parallel to each other, and wherein the rotational direction of one of the two co-rotating twin-screw extruders may be the same as or different from the other co-rotating twin-screw extruder, and wherein the two co-rotating twin-screw extruders are followed by a counter-rotating twin-screw extruder that serves to build up pressure.

9. An extruder apparatus for mixing compounds with residence time requirements and which also must be extruded at a desired pressure as in claim 6 wherein the two co-rotating screws have different directions of rotation, and a screw shaft in each of the two co-rotating twin-screw extruders is lengthened and connected to a screw shaft of the counter-rotating twin-screw extruder, so that screw shafts of the twin screw extruder then counter-rotate.

10. An extruder apparatus for mixing compounds with residence time requirements and which also must be extruded at a desired pressure as in claim 6 wherein a drive is provided having four output shafts, which are connected to the screw shafts of the co-rotating twin-screw extruders.

11. A method of mixing and extruding compounds having residence time requirements and for providing a desired exit pressure comprising:
   sending compounds through a first co-rotating twin screw extruder to mix the compounds;
   sending the compounds mixed in the first co-rotating twin screw extruder through a second co-rotating twin screw extruder, separate from said first co-rotating twin screw extruder, to mix the compounds; and
   sending the compounds mixed in the first and second co-rotating twin screw extruders through a counter-rotating twin screw extruder to buildup a desired exit pressure in the compounds.

* * * * *